May 26, 1931.  G. PISANI  1,807,171
ANIMAL TRAP
Original Filed Feb. 17, 1922
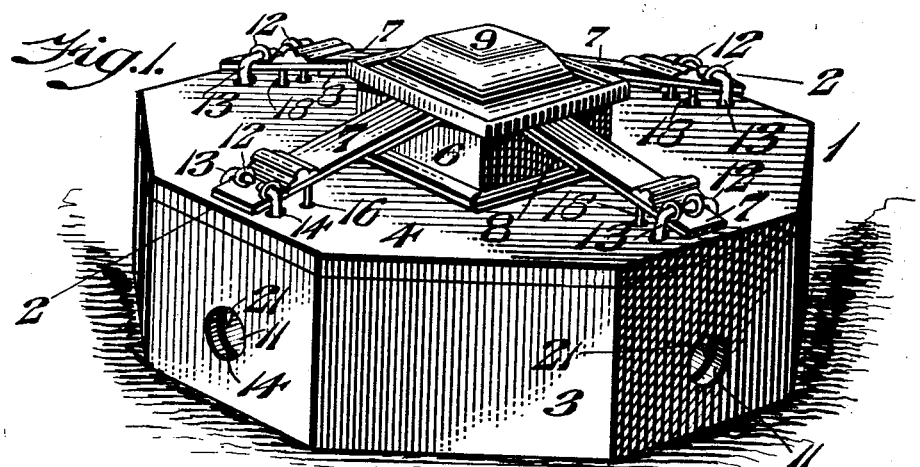
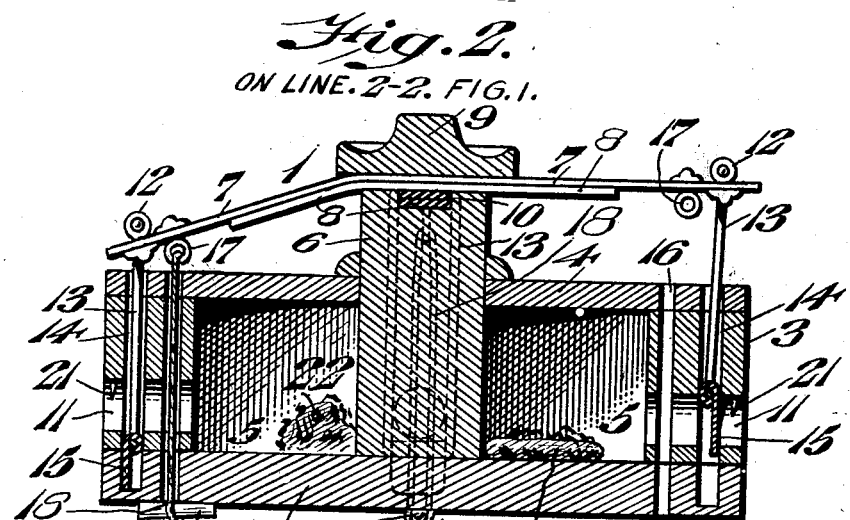
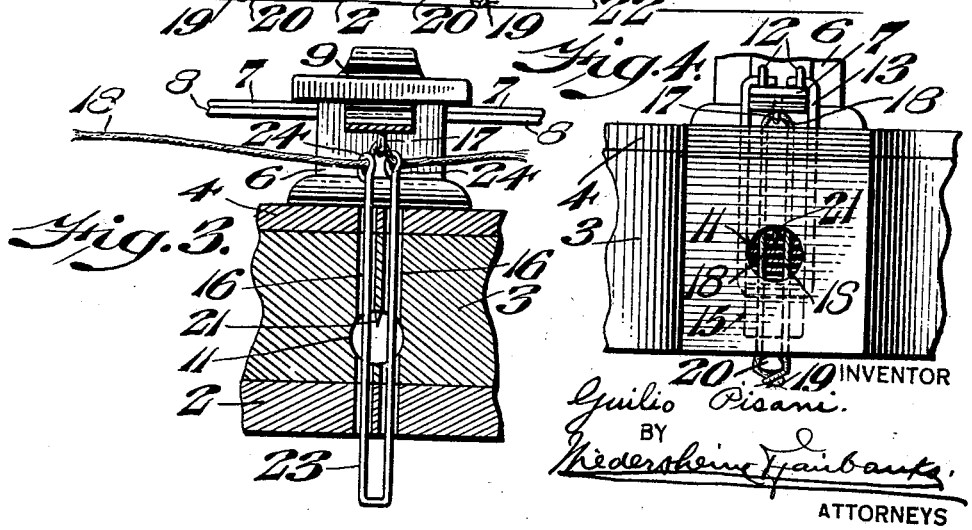
INVENTOR
Guilio Pisani.
BY
ATTORNEYS Patented May 26, 1931

1,807,171

UNITED STATES PATENT OFFICE

GUILIO PISANI, OF FARWELL, PENNSYLVANIA, ASSIGNOR OF ONE-HALF TO SANTO PAOLETTI, OF RENOVO, PENNSYLVANIA, AND ONE-HALF TO FRANK DE LEECE, OF PHILADELPHIA, PENNSYLVANIA

ANIMAL TRAP

Substitute for application Serial No. 537,147, filed February 17, 1922. This application filed October 10, 1928. Serial No. 311,654.

In common with the subject of my abandoned application filed February 17, 1922, Serial No. 537,147, the present invention relates to an animal trap which is preferably provided with a central chamber having a number of entrances opening into it, each of which is controlled by means of a novel construction and arrangement of trapping mechanism.

It further consists of a novel construction of an animal trap wherein the trap is released by the animal severing a cord which prevents it from reaching the bait unless the cord is severed.

It further consists of novel means for killing the animal which enters the trap and for preventing an animal reaching the bait when any portion of the trap is unsprung.

Other novel features of construction and advantage will more clearly appear in the detailed description of our invention.

For the purpose of illustrating my invention, I have shown in the accompanying drawings a typical embodiment thereof which is at present preferred by me, since this embodiment will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents, in perspective, an animal trap, embodying my invention,

Figure 2 represents a section on line 2—2 of Figure 1,

Figure 3 represents a sectional view of a portion of the trap in unset position showing more clearly the manner in which the trap is set, Figure 4 represents, in front elevation, a portion of the trap in set position.

Similar numerals of reference indicate corresponding parts. Referring to the drawing 1 designates an animal trap embodying my invention, the casing portion of which is provided with the closed bottom 2, slides 3 and a top 4.

5 designates the internal chamber of the trap in which the bait is placed. 6 designates a post preferably carried by the bottom 2 and extending through the top 4 and at its upper end it is provided with a desired number of flexible bars 7 which are reinforced by means of spring plates 8, said bars and spring plates being held in position by means of a cap 9 secured to the post in any desired manner.

The post 6 is preferably recessed, as indicated at 10, in order to receive one of the flexible bars 7 and its spring member 8. The sides 3 are provided with a desired number of apertures 11 which afford communication to the bait chamber 5 and which are preferably of such diameter that only the head of the animal can enter an aperture 11. Each bar 7 at its outer end is provided with the eyelets 12 which receive the deflected ends of the U-shaped rods 13 which extend through the apertures 14 in the cover 4 and the sides 3.

The loops formed by the bottom portion of the U-shaped rods 13 have connected to them plates 15 which close the apertures 11 when the trap is in its unset position. Inwardly of the apertures 14, a pair of apertures 16 are provided which pass through the cover 4, sides 3 and the bottom 2.

The end of each flexible bar 7 is provided with eyelets 17 through which passes a cord 18 which passes through the apertures 16 and the free ends are then tied together after the flexible bar 7 has been drawn downwardly, as indicated at 19.

A wedge of wood or other material 20 is then inserted to retain the trap in set position. Each aperture 11 preferably has depending from its upper wall the spike 21. 22 designates the bait which is placed within the bait chamber 5. The bait 22 can be inserted into the bait chamber 5 through the apertures 11 and the trap is now ready to be set.

For this purpose, I preferably employ a U-shaped rod 23 having eyelets 24 at its upper free ends. This setting member formed by the rod 23 is inserted through the apertures 16 and the cord 23 is inserted through the apertures 16 and the cord 18 is then passed through the eyelets 17 and through the eyelets 24. The setting member 23 is then drawn downwardly to draw the cord through the apertures 16 and the free ends of the cord are then tied, as at 19, and a wedge 20 inserted.

The trap is now set so that in order for an animal to reach the bait 22 it must first sever the cord 18 in order to release the spring formed by the flexible bar 7 which forms a spring member.

Immediately upon the severing of the cord 18 the spring 7 will be released and fly upwardly drawing with it the U-shaped rods 13 which form a noose and the animal will be caught by the bottom of the U-shaped rods 13 contacting with its neck thus moving the animal's head upwardly so that the spike 21 will enter the head or back of the animal and thus effect its extermination.

As the U-shaped rods 13 move upwardly, the aperture closure formed by the plate 15 will move upwardly so that when the animal which has been caught has been removed from the trap, the plate 15 will close its respective opening 11 and the other portions of the trap which are set will be effective and in operative condition to catch animals at the other opening.

It will be apparent that in accordance with our present invention that the animal in attempting to enter an aperture 11 to reach the bait 22 must first sever the cord 18 and as soon as the cord 11 is severed the trap will spring and the animal will be caught.

It will be seen that there is no chance of the animal removing the bait from the trap so that the same bait can be employed for a long period of time.

It will now be apparent that I have devised a novel and useful construction of an animal trap which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new is:

1. An animal trap, comprising a casing having a bait receiving chamber, and an aperture communicating with said chamber, a spring actuated trapping device to move across said aperture to trap the animal, means carried by said trapping device below the same to close said aperture when the trapping device is in its sprung position and means to retain said trap in set condition until released by the animal.

2. An animal trap, comprising a casing having a bait receiving chamber and an aperture communicating with said chamber, a spring actuated trapping device to move across said aperture to trap the animal, a plate carried by and arranged to follow said trapping device to close said aperture when the trapping device is in its sprung position, and means to retain the trap in set condition until released by the animal.

In testimony whereof I affix my signature.

GUILIO PISANI.